United States Patent Office 2,957,843
Patented Oct. 25, 1960

2,957,843

THERMOSETTING COMPOSITION COMPRISING AN UNSATURATED POLYESTER RESIN, VINYL MONOMER AND A POLYALKYLENE GLYCOL AND PROCESS FOR PRODUCING SAME

Ralph S. Anderson, Watchung, and Patricia T. Fisher, Bound Brook, N.J., assignors to Union Carbide Corporation, a corporation of New York No Drawing. Filed Jan. 29, 1958, Ser. No. 711,783

15 Claims. (Cl. 260—33.2)

This invention relates to improved unsaturated polyester resin-vinyl monomer thermosetting compositions. More particularly, this invention relates to unsaturated polyester resin-vinyl monomer thermosetting compositions containing a polyalkylene glycol.

A problem of long standing in the use of unsaturated polyester resin-vinyl monomer thermosetting compositions for coating and filling applications has been the excessive drainage from the coated or filled part after the composition has been applied. This excessive drainage, particularly from inclined or vertical surfaces often referred to as crawling or cratering, is readily detected as it is manifested by a thinly coated area surrounded by a thicker coating. Generally, some drainage occurs at room temperature and continues until sufficient amounts of solvent or diluent, usually present in the composition, have evaporated thereby causing the viscosity of the coating or filling on the surface or in the interstices of the treated object to become sufficiently high to enable it to remain in position.

Attempts have been made to overcome this shortcoming by increasing the viscosity of the unsaturated polyester resin-vinyl monomer compositions by: (1) using a polyester resin of higher molecular weight, and (2) decreasing the amount of diluent or solvent in the mixture. These methods, however, have proved neither practical nor advantageous. The first alternative requires a longer polymerization time in the preparation of the unsaturated polyester resins and, therefore, presents the distinct possibility of an interpolymerization reaction taking place through the unsaturated bonds of the polyester with the consequent formation of a cross-linked, gelled structure. The second alternative results in resins characterized by low heat distortion values, once they are cured.

We have now found that the aforementioned problem of excessive drainage with respect to unsaturated polyester resin-vinyl monomer thermosetting compositions can be unexpectedly overcome by incorporating in said compositions a polyalkylene glycol whereby compositions are produced which have surprisingly increased viscosity and are suitable for coating, filling, painting, laminating and other such applications wherein the deficiencies such as cratering, crawling, sag, and run-off from inclined surfaces are substantially eliminated with no sacrifice of the physical properties of the compositions.

The addition of a polyalkylene glycol to an unsaturated polyester resin-vinyl monomer composition produces the following beneficial effects: (1) it yields a composition of high viscosity; (2) it affords uniformity of product; (3) there is no tendency for the separation of the additive from the system thereby affording a good measure of reproducibility of the characteristics of a particular composition; (4) the modified polyester mixture has good sag-resistance properties due to its increased viscosity and accompanying relative immobility; (5) the additive is instrumental in suspending any pigment, filler or other such material uniformly throughout the polyester composition; (6) the viscosity increase resulting from the addition of polyalkylene glycol compounds to the composition is accomplished at no basic sacrifice of the physical properties of the modified resin-vinyl monomer mixtures.

Generally, adding from about 0.025 to about 20 percent by weight of a polyalkylene glycol, particularly a polyalkylene glycol having an average molecular weight of from about 3,000 to about 20,000, based on the weight of a copolymerizable mixture of an unsaturated polyester resin and a vinyl monomer, produces a composition of high viscosity suitable, as previously stated, for coating, filling, painting, and laminating wherein the previously mentioned deficiencies such as cratering, crawling, sag, run-off from inclined surfaces are substantially eliminated.

Additions of below about 0.025 percent by weight based on the weight of the unsaturated polyester resin-vinyl monomer mixture result in no significant increase in viscosity being imparted to the unsaturated polyester resin-vinyl monomer composition; while additions above about 20 percent by weight plasticize the resin composition thereby decreasing its hardness and generally decreasing its mechanical strengths.

The increase in viscosity imparted to an unsaturated polyester resin-vinyl monomer mixture by the addition thereto of a polyalkylene glycol having an average molecular weight of between about 3,000 and 20,000 is most surprising and entirely unexpected. Normally, it would be expected that a relatively non-viscous solution comprising a polyalkylene glycol dissolved in a vinyl monomer would act as a diluent when present in a relatively viscous resin composition and would consequently lower the viscosity of the aforementioned composition.

The relatively low viscosity of polyalkylene glycol-vinyl monomer solutions is shown in Table I wherein "Carbowax 4000," a polyethylene glycol having an average molecular weight of between about 3,000 and 3,700; "Carbowax 6000," a polyethylene glycol having an average molecular weight of between about 6,000 and 7,000; and "Carbowax 20M," a polyethylene glycol adduct having an average molecular weight of between about 15,000 and 20,000 were dissolved in styrene by heating the styrene-polyalkylene glycol mixture at a temperature of between 55° and 60° C. The viscosity of the resultant solutions was determined using a standard Brookfield viscometer. The percent by weight of the "Carbowax" is based on the weight of the styrene.

TABLE I

| Styrene—"Carbowax" Solutions | Brookfield "Peak" Viscosity at 25° C. |
|---|---|
| Styrene—"Carbowax 4000" solutions: | |
| Solution I; containing 1% by weight "Carbowax 4000." | less than 5.4 centipoise. |
| Solution II; containing 5% by weight "Carbowax 4000." | less than 5.5 centipoise. |
| Solution III; containing 10% by weight "Carbowax 4000." | less than 5.5 centipoise. |
| Styrene—"Carbowax 6000" solutions: | |
| Solution IV; containing 1% by weight "Carbowax 6000." | less than 5.4 centipoise. |
| Solution V; containing 5% by weight "Carbowax 6000." | less than 5.5 centipoise. |
| Solution VI; containing 10% by weight "Carbowax 6000." | less than 5.5 centipoise. |
| Styrene—"Carbowax 20M" solutions: | |
| Solution VII; containing 1% by weight "Carbowax 20M." | less than 5.4 centipoise. |
| Solution VIII; containing 5% by weight "Carbowax 20M." | less than 5.5 centipoise. |
| Solution IX; containing 10% by weight "Carbowax 20M." | less than 5.5 centipoise. |

To illustrate the increase in viscosity imparted to unsaturated polyester resin-vinyl monomer mixtures by polyalkylene glycols having a molecular weight of between about 3,000 and 20,000, three polyalkylene glycols, namely "Carbowax 4000," "Carbowax 6000" and "Carbowax 20M" were added to two unsaturated polyester resin-vinyl monomer mixtures designated as Composition A and Composition B. The viscosity of the compositions devoid of any "Carbowax" and the viscosity of the compositions containing the aforementioned "Carbowaxes" was determined and noted in Table II.

Composition A is an unsaturated polyester resin-vinyl monomer mixture whose composition and method of preparation are described in Example I of this specification with the exception that in preparing the resin the following reactants are used: 3.2 moles of propylene glycol, 1.8 moles of maleic anhydride, and 1.2 moles of phthalic anhydride.

Composition B is an unsaturated polyester resin-vinyl monomer mixture whose composition and method of preparation are described in Example I of this specification with the exception that in preparing the resin the following reactants were used: 1.3 moles of propylene glycol, 1.8 moles of diethylene glycol, 1.5 moles of maleic anhydride and 1.5 moles of phthalic anydride.

The weight of the "Carbowax" in the following tables is based on the weight of the unsaturated polyester resin-vinyl monomer mixture.

TABLE II

| Composition | Brookfield "Peak" Viscosity at 25° C., centipoise |
| --- | --- |
| Composition A containing no "Carbowax" | 3,000 |
| Composition A containing 0.25 percent by weight of "Carbowax 4000" | 4,000 |
| Composition A containing 1 percent by weight of "Carbowax 4000" | 5,000 |
| Composition A containing 20 percent by weight of "Carbowax 4000" | 50,000 |
| Composition B containing 0.125 percent by weight of "Carbowax 4000" | 5,000 |
| Composition B containing 1 percent by weight of "Carbowax 4000" | 6,000 |
| Composition B containing 10 percent by weight of "Carbowax 4000" | 9,000 |
| Composition B containing 15 percent by weight of "Carbowax 4000" | 30,750 |
| Composition B containing no "Carbowax" | 3,180 |

TABLE III

| Composition | Brookfield "Peak" Viscosity at 25° C., centipoise |
| --- | --- |
| Composition A containing no "Carbowax" | 3,000 |
| Composition A containing 0.25 percent by weight of "Carbowax 6000" | 4,000 |
| Composition A containing 1 percent by weight of "Carbowax 6000" | 6,250 |
| Composition A containing 5 percent by weight of "Carbowax 6000" | 7,500 |
| Composition A containing 15 percent by weight of "Carbowax 6000" | 12,750 |
| Composition A containing 20 percent by weight of "Carbowax 6000" | 20,750 |
| Composition B containing 0.125 percent by weight of "Carbowax 6000" | 5,000 |
| Composition B containing 1 percent by weight of "Carbowax 6000" | 8,000 |
| Composition B containing 10 percent by weight of "Carbowax 6000" | 14,250 |
| Composition B containing 15 percent by weight of "Carbowax 6000" | 23,750 |
| Composition B containing 20 percent by weight of "Carbowax 6000" | 37,750 |
| Composition B containing no "Carbowax" | 3,180 |

TABLE IV

| Composition | Brookfield "Peak" Viscosity at 25° C., centipoise |
| --- | --- |
| Composition A containing no "Carbowax" | 3,000 |
| Composition A containing 1 percent by weight of "Carbowax 20M" | 5,340 |
| Composition A containing 7 percent by weight of "Carbowax 20M" | 18,640 |
| Composition A containing 10 percent by weight of "Carbowax 20M" | 23,100 |
| Composition A containing 15 percent by weight of "Carbowax 20M" | 51,400 |
| Composition A containing 20 percent by weight of "Carbowax 20M" | 85,650 |
| Composition B containing 1 percent by weight of "Carbowax 20M" | 4,910 |
| Composition B containing 7 percent by weight of "Carbowax 20M" | 14,880 |
| Composition B containing 10 percent by weight of "Carbowax 20M" | 51,600 |
| Composition B containing no "Carbowax" | 3,180 |

The "dilution effect" normally expected by adding a polyalkylene glycol to an unsaturated polyester resin-vinyl monomer mixture is illustrated by the tabulated data of Table V wherein "Carbowax 1500," a polyethylene glycol having an average molecular weight of between about 500 to 600 was added to the previously described Compositions A and B. The "Carbowax" was melted from a waxy paste to a liquid and then added to the unsaturated polyester-vinyl monomer mixture. The percent by weight of the "Carbowax" is based on the weight of the unsaturated resin-vinyl monomer mixture.

TABLE V

| Composition | Brookfield "Peak" Viscosity at 25° C., centipoise |
| --- | --- |
| Composition A containing no "Carbowax" | 3,000 |
| Composition A containing 1 percent by weight of "Carbowax 1500" | 3,080 |
| Composition A containing 5 percent by weight of "Carbowax 1500" | 1,880 |
| Composition A containing 15 percent by weight of "Carbowax 1500" | 1,520 |
| Composition A containing 25 percent by weight of "Carbowax 1500" | 1,240 |
| Composition B containing 5 percent by weight of "Carbowax 1500" | 2,340 |
| Composition B containing 10 percent by weight of "Carbowax 1500" | 1,880 |
| Composition B containing 15 percent by weight of "Carbowax 1500" | 1,520 |
| Composition B containing 25 percent by weight of "Carbowax 1500" | 1,240 |
| Composition B containing no "Carbowax" | 3,180 |

In addition to the unexpected increase in viscosity effected in unsaturated polyester resin-vinyl monomer mixtures by the addition thereto of polyalkylene glycols having an average molecular weight of between about 3000 and 20,000 such additions of polyalkylene glycols produce a composition having the property or phenomenon, generally referred to as a "thixotropic" property, of becoming fluid when shaken or subjected to a force, but once the stress is removed, regaining its viscosity or consistency upon standing. The thixotropy imparted by the polyalkylene glycols is reversible and not a transient phenomenon and is dependent upon the amount and molecular weight of the polyalkylene glycol as well as the particular type of unsaturated polyester resin-vinyl monomer mixture to which the glycol is added.

The term "thixotropy" as used herein designates the property of a viscous composition of becoming fluid under the application of mechanical agitation or force and having the ability of reverting on standing into a viscous gel-like mass having sufficient cohesive strength to withstand distortion by gravitational force when suspended freely as in an inverted receptacle or on an inverted coated article.

The thixotropy which is effected by the polyalkylene glycols of this invention is important in molding and premix molding applications. In such applications the composition must be rather viscous and have a good consistency and yet must have the added ability of becoming fluid under shear or stress. The responsive change in the physical condition of the composition must be rapid otherwise the composition will cure before it has filled the mold cavities, thus giving rise to so-called molding "shorts."

To further indicate the thixotropic effect produced by polyalkylene glycols in unsaturated polyester resin-vinyl monomer compositions, three modified compositions were subjected to a constant shearing stress. If a composition is thixotropic in nature its apparent viscosity will decrease with time to some minimum value at a constant rate of shear. A thixotropic composition will be characterized by a definite and peak viscosity at the time the force is initially applied and the viscosity will progressively decrease until a steady state viscosity is obtained. Beyond this point the viscosity will not decrease any further. The ratio of these two viscosities is an indication of the ultimate thixotropy potential or the degree of thixotropy of a given composition under fixed stress conditions. The greater the quotient, obtained by dividing the initial viscosity by the steady state viscosity, the "more thixotropic" is the given composition. The thixotropic effect produced by a polyalkylene glycol, i.e. "Carbowax 20M," having an average molecular weight of from 15,000 to 20,000, with an accompanying increase in viscosity is strikingly illustrated by the following data wherein a standard Brookfield viscometer was used in taking viscosity measurements at 25° C. of three compositions, C, D and E containing the said "Carbowax 20M." Readings were taken after the first and fourth rotation of the Brookfield viscometer spindle operated at constant speed. The final reading was taken under a steady state condition which was reached in approximately 8 hours.

Composition C comprised an unsaturated polyester resin-vinyl monomer mixture whose composition and process of preparation are described in the specification in Example I; and 1 percent by weight of "Carbowax 20M" based on the weight of the unsaturated polyester resin-vinyl monomer mixture.

Composition D comprised an unsaturated polyester resin-vinyl monomer mixture whose composition and process of preparation are described in the specification in Example I with the exception that six parts by weight of adipic acid were used in the preparation of the resin; and 1 percent by weight of "Carbowax 20M" based on the weight of the unsaturated polyester resin-vinyl monomer mixture.

Composition E comprised an unsaturated polyester resin-vinyl monomer mixture whose composition and process of preparation are described in the specification in Example II; and 4 percent by weight of "Carbowax 20M" based on the weight of the unsaturated polyester resin-vinyl monomer mixture.

TABLE VI

| Composition | First Rotation, centipoise | Fourth Rotation, centipoise | Constant Reading, centipoise | Thixotropy Potential—First Rotation Viscosity Divided by Constant Reading Viscosity |
|---|---|---|---|---|
| Composition C | 38,800 | 30,200 | 14,000 | 2.7 |
| Composition D | 32,000 | 26,300 | 12,200 | 2.6 |
| Composition E | 35,000 | 8,000 | 8,000 | 4.4 |

The unsaturated polyester resin-styrene monomer mixtures, Compositions C, D and E devoid of the "Carbowax 20M" were also subjected to the same viscosity test at 25° C. using a Brookfield viscometer. The following tabulated data shows the low viscosity of such unmodified compositions as compared to the viscosity measurements noted in Table VI for the same compositions containing "Carbowax 20M." Furthermore, these compositions, without the Carbowax, were not thixotropic.

| Composition | Viscosity at 25° C. (Peak viscosity values) taken after the first rotation, centipoise |
|---|---|
| Composition C (without any "Carbowax 20M") | 2,010 |
| Composition D (without any "Carbowax 20M") | 2,130 |
| Composition E (without any "Carbowax 20M") | 750 |

Among the polyalkylene glycols having an average molecular weight of between about 3000 and 20,000 which can be added to unsaturated polyester resin-vinyl monomer mixtures to increase the viscosity or to increase the viscosity and also to impart thixotropic properties to the aforementioned mixtures are polyethylene glycol, methoxy polyethylene glycol, polypropylene glycol, methoxy polypropylene glycol and the commercially available polyalkylene glycols marketed under the trade name "Carbowax" by the Union Carbide Corporation; "Carbowax 4000," "Carbowax 6000," and "Carbowax 20M."

The "Carbowax" products are a series of solid polyethylene glycols of high molecular weight.

"Carbowaxes" are not separate and distinct compounds but rather they are mixtures of individual polymers. Each product represents a band of molecular weights, the average of which is employed in defining a particular member of the series. The following "Carbowaxes" are presently commercially available: "Carbowax 1000," "Carbowax 1500," "Carbowax 1540," "Carbowax 4000," "Carbowax 6000," and "Carbowax 20M."

The unsaturated polyester resins that can be employed in formulating the compositions of our invention are generally the reaction products of polyhydric alcohols, mixtures of polyhydric alcohols or mixtures of polyhydric alcohols and monohydric alcohols and an olefinic unsaturated polycarboxylic acid or an anhydride thereof or a plurality of polycarboxylic acids, one of which at least is an olefinic unsaturated polycarboxylic acid or an anhydride thereof.

As examples of polyhydric alcohols may be mentioned ethylene glycol, diethylene glycol, triethylene glycol, propylene glycol, 1,3-propanediol, dipropylene glycol, butylene glycol, trimethylene glycol, pentamethylene glycol, glycerin, 2-ethyl hexanol diol-1,3, sorbitol, pentaerythritol and fatty alcohols, such as 12-hydroxy-stearyl alcohol.

Illustrative of olefinic unsaturated polycarboxylic acids and anhydrides may be mentioned maleic, chloromaleic, citraconic, and itaconic acids and anhydrides thereof also tetrahydrophthalic anhydride, tetrachlorophthalic anhydride and carbic anhydride. Fumaric acid can also be used as well as the anhydrides resulting from the Diels-Alder reaction as exemplified by the reaction between butadiene or dicyclopentadiene with maleic anhydride. Mixtures of olefinic unsaturated acids and/or anhydrides thereof can be used.

As a rule, relatively less expensive polycarboxylic acids free from olefinic unsaturation are used to replace in part the olefinic unsaturated acids or anhydrides in building up the polyester molecule. Examples of these polycarboxylic acids are adipic, succinic, sebacic, glutaric, phthalic, terephthalic, chlorophthalic, and isophthalic acid. Mixtures of these acids can also be used.

By varying either the ratio of the alcoholic content or ratio of the acid content of the polyester or the ratio of the olefinic unsaturated polycarboxylic acids or anhydrides thereof to the polycarboxylic acids free of olefinic unsaturation or varying the reaction time, polyester resins of varying molecular weights can be obtained. The type of unsaturated polyester resin prepared will depend on its desired ultimate use.

The unsaturated polyester resins of this invention will themselves cure to a thermoset material. It is the practice, however, to add a vinyl monomer, which acts as a cross-linker, to the polyester. The presence of a vinyl monomer cross-linker is advantageous as it decreases the resin cost, increases the ease of handling and application, and increases the rate and degree of cure of the polyester. The monomeric vinyl compounds that are suitable have the general formula $CH_2=CH-R$ where R is a negative group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers having utility for the purposes of this invention and which illustrate "R" as aryl (or substituted aryl) include styrene, halogen substituted styrenes such as ortho-chlorostyrene, para-iodo styrene, fluoro styrene, dichlorostyrene; alkyl substituted styrenes such as para-ethyl styrene and tertiary butyl styrene; ethoxy styrene and para-phenoxy styrene illustrate other substituted aryl groups; para-dimethyl amino styrene illustrates an amino substituted aryl group; vinyl biphenyl and vinyl naphthalene illustrate aryl substituted aryl; ortho vinyl benzoic acid and orthovinyl phenyl acetic acid depict the carboxyl substituted aryl groups.

Vinyl monomers where "R" is ketonic are represented by ethyl vinylketone, propyl vinyl ketone and phenyl vinyl ketone. "R" as a heterocyclic group is typified by 2-vinyl pyridine, 2-vinyl quinoline, vinyl pyrrole, vinyl carbazole and vinyl thiophene.

"R" as nitrile is represented by acrylonitrile, and similarly "R" as carboxy or amido are typified by acrylic acid and acrylamide, respectively.

"R" as carbalkoxy includes as specific vinyl monomers the alkyl acrylates, such as methyl acrylate, butyl acrylate, octyl acrylate, lauryl acrylate and cyclohexyl acrylate, and aryl acrylates such as phenyl acrylate and aralkyl acrylates such as benzyl acrylate.

Generally the amount of vinyl monomer added to the unsaturated polyester resin varies from about 20 to about 75 percent by weight of the unsaturated polyester resin.

Most unsaturated polyester resins are not very stable on storage, particularly at high temperatures in the presence of air. The tendency for rapid cross-linking is enhanced when in admixture with a vinyl monomer. Generally, there is added to the unsaturated polyester resin-vinyl monomer mixture about 0.01% to −0.001% or even less of an inhibitor such as p-tertiary butyl catechol, hydroquinone, p-nitrosodimethylaniline or similar compounds which decrease the cross-linking tendencies of the unsaturated polyester resin. The amount of inhibitor is based on the weight of the resin-monomer mixture.

Increasing the speed of the copolymerization between the unsaturated polyester and vinyl monomer to yield a cross-linked, hardened structure is effected by the addition of small amounts, e.g., 0.1 to 2% by weight (based on the total weight of the polyester and vinyl monomer) of free-radical initiators, such as peroxides and azo compounds. Among the former may be cited benzoyl peroxide, cyclohexanone peroxide, cumene hydroperoxide and methyl ethyl ketone peroxide.

In some applications it is very desirable to reduce the curing time required for the gelling reaction of the polyester resin-vinyl monomer mixture. To achieve this result, a promoter of the aryl tertiary amine class such as diethyl aniline may be added to the resin solution; pregelled structures with sufficient rigidity are thereby obtained which can be finally oven curved. Room temperature curing may be obtained by addition to the system of an activator typified by cobalt in the form of the naphthenate salt.

Fillers, lubricants, and/or other such additives can also be added to the compositions of this invention.

The following examples further illustrate this invention without in any way limiting the scope thereof. The percent by weight of "Carbowax" is based on the weight of the unsaturated polyester-vinyl monomer mixture.

*Exmple I*

Into a five-liter, three-necked ground glass flask equipped with a stirrer, a thermometer, a carbon dioxide inlet tube, a Dean-Stark trap and a condenser, was charged 30.7 parts by weight of fumaric acid, 4.3 parts by weight of adipic acid, 0.3 part by weight of oxalic acid, 39.4 parts by weight of dipropylene glycol and small amounts of triphenyl phosphite and hydroquinone. The stirrer was started and a slow stream of carbon dioxide was introduced into the reaction flask. The charge was then heated to 185°–190° C. and the time the reflux began was recorded. The mixture was then gradually heated to 193°–196° C. and the trap was filled with xylene. The water resulting from the esterifiction reaction was removed from time to time from the bottom of the trap and xylene added as required to maintain a good rate of reflux at 193–196° C. Acid numbers were recorded starting four hours from the initiation of reflux and every hour thereafter. When an acid number of 29–32 was obtained, the trap was emptied and vacuum was applied for the removal of the xylene. Vacuum of 28 inches of mercury was maintained at 185°–190° C. for 20 to 25 minutes. When the temperature fell to 180° C., the vacuum was released and a second small amount of hydroquinone was carefully added to the resin with slow speed agitation. The reaction product was permitted to cool down to 105° C. and it was then run into styrene with vigorous stirring so as to give a solution containing 100 parts by weight of the unsaturated polyester resin per 29 parts by weight of styrene. When the mixture reached 70° C., 5 percent by weight of "Carbowax 6000," a polyethylene glycol having an average molecular weight of 6000–7500 was added to it and vigorous stirring maintatined until complete solution of the additive was effected.

This modified composition showed a definite thixotropic character and had a Brookfield peak viscosity of 20,040 centipoises at 25° C. as compared to a Brookfield peak viscosity of 2010 when no "Carbowax" additive was added to the composition.

As previously pointed out, the increased viscosity resulting from the addition of a polyethylene glycol compound to unsaturated polyester resin-vinyl monomer mixtures is accomplished at no basic sacrifice of the physical properties of the polyester-vinyl monomer mixture. This point is illustrated by the following tabulated data which is a comparison of the physical properties of two glass laminates and also of two unfilled castings, one laminate and one casting each containing the unsaturated polyester resin-vinyl monomer mixture whose composition and method of preparation was described in Example I in combination with 1.64 percent by weight of "Carbowax 20M." The other laminate and casting contained the same unsaturated polyester resin-vinyl monomer mixture devoid of any "Carbowax."

Accordingly, a glass laminate was prepared by impregnating three glass mats with the modified unsaturated polyester resin-styrene monomer mixture of Example I, superimposing the mats on one another and welding in a flat press mold at pressures in the order of from 1000 to 2000 lbs. per square inch at a temperature of from 125° C. to 175° C. for a period of time of from 15 to 60 minutes to produce a cured glass laminate.

A second laminate was prepared in precisely the same fashion with the exception that the unsaturated polyester resin-styrene monomer mixture did not contain any "Carbowax."

The castings were prepared in the conventional manner by casting into a lead mold.

| Properties of Glass Mat Laminates | ASTM Proc. No. | Polyester Resin-Styrene Monomer | Polyester Resin-Styrene Monomer & "Carbowax 20M" |
|---|---|---|---|
| Flexural Strength at room temp., p.s.i. | D-695-49T | 31,000 | 29,200 |
| Flexural Strength at 160° F., p.s.i. | D-695-49T | 16,000 | 18,100 |
| Flexural Modulus, p.s.i. | D-790-49T | 1.3×10⁶ | 1.13×10⁶ |
| Flexural Modulus at 160° F., p.s.i. | D-790-49T | 1.2×10⁶ | 0.98×10⁶ |
| Tensile Strength, p.s.i. | D-882-54TC | 14,000 | 16,700 |
| Tensile Modulus, p.s.i. | D-882-54TC | 1.0×10⁶ | 1.15×10⁶ |
| Compressive Strength, p.s.i. | D-790-52T | 17,000 | 15,400 |
| Properties of Unfilled Castings: | | | |
| Heat Distortion, °C | D-248-45T | 110 | 104 |
| Flexural Modulus at room temp., p.s.i. | D-790-49T | 0.33×10⁶ | 0.27×10⁶ |

*Example II*

An unsaturated polyester resin-vinyl monomer mixture was prepared as described in Example I with the exception that the reactants used to produce the polyester resin were: 1.8 moles of 12-hydroxy stearyl alcohol, 3.6 moles of propylene glycol, 3 moles of maleic anhydride and 2 moles of phthalic anhydride. Again sufficient styrene was added to give a solution containing 100 parts by weight of resin per 29 parts by weight of styrene. To this mixture was added 4 percent by weight of "Carbowax 20M." The modified polyester resin-vinyl monomer mixture showed good viscosity and thixotropic characteristics as indicated by the following tabulated data.

| Composition | Viscosity at 25° C. as determined by a Brookfield Viscometer | | |
|---|---|---|---|
| | First Rotation, centipoise | Fourth Rotation, centipoise | Thixotropy Potential |
| Polyester resin-vinyl monomer mixture of Example II containing 4 percent by weight of "Carbowax 20M" | 35,000 | 8,000 | 4.4 |

The same mixture containing no "Carbowax" had a peak viscosity at 25° C. of 750 centipoises and exhibited no thixotropic properties.

*Example III*

Two unsaturated polyester resin-vinyl monomer mixtures were prepared using the same reactants and procedures of Example I. To one of these mixtures designated as Composition F was added 2 percent by weight of "Carbowax 20M." No "Carbowax" was added to the second mixture, designated as Composition G. Thirty-five parts by weight of each, Composition F and G, were used in the preparation of two premix molding formulations wherein the amount of each additional component is expressed in parts by weight below.

Sisal (½ inch) _____ 21
Asbestos filler _____ 23.5
Calcium carbonate filler _____ 19.5
Lupero ATC (catalyst) comprising 50% benzoyl peroxide and 50% tricresyl phosphate) _____ 0.7
Zinc stearate (lubricant) _____ 1.0

Each pre-mix was kneaded for 15 minutes in a cold laboratory kneader and flexural bars and plates were preformed and molded at 270°–280° F. for 3 minutes under a pressure of 750 p.s.i. The mechanical properties of each system were determined by testing these bars and plates. The tabulated data appearing below conclusively shows that the unsaturated polyester resin-vinyl monomer molding composition modified by a polyalkylene glycol was characterized by higher mechanical properties. Data again shows that additions of polyalkylene glycols to the unsaturated polyester resin-vinyl monomer mixtures do not degrade the physical properties of the said mixtures.

ROOM TEMPERATURE

| Property | ASTM Proc. No. | Composition G | Composition F |
|---|---|---|---|
| Bar Flexural Strength, p.s.i. | D-695-49T | 5720 | 7050 |
| Bar Flexural Modulus, p.s.i. | D-790-49T | 0.692×10⁶ | 0.974×10⁶ |
| Plate Flexural Strength, p.s.i. | D-695-49T | 5520 | 6390 |
| Plate Flexural Modulus, p.s.i. | D-790-49T | 0.580×10⁶ | 0.463×10⁶ |
| Impact Strength, ft.-lbs./in. | D-256-47T | 2.619 | 2.825 |

ELEVATED TEMPERATURE (100° C.)

| Bar Flexural Strength, p.s.i. | D-695-49T | 2248 | 2770 |
| Bar Flexural Modulus, p.s.i. | D-790-49T | 0.153×10⁶ | 0.21×10⁶ |
| Plate Flexural Strength, p.s.i. | D-695-49T | 1980 | 2850 |
| Plate Flexural Modulus, p.s.i. | D-790-49T | 0.171×10⁶ | 0.177×10⁶ |
| Impact Strength, ft.-lbs./in. | D-256-47T | 3.18 | 3.47 |

*Example IV*

Samples of dipropylene fumarate adipate resin-styrene mixture whose components and method of preparation are described in Example I were modified by adding thereto "Carbowax 4000," "Carbowax 6000" and "Carbowax 20M." The viscosity of each sample composition was determined and also each composition was tested in order to determine whether or not thixotropy was imparted by the addition of the aforementioned additives.

A thixotropic composition flowed easily when subjected to a stirring operation.

The data obtained is shown in the following table.

| Composition | Brookfield "Peak" Viscosity at 25° C., centipoises | Nature of the Composition |
|---|---|---|
| Dipropylene fumarate adipate resin-vinyl monomer containing indicated amount of "Carbowax": | | |
| 1. Control—no "Carbowax" | 2,033 | not thixotropic. |
| 2. 1.7 percent "Carbowax 4000" | 3,230 | not thixotropic. |
| 3. 1.9 percent "Carbowax 4000" | 4,470 | not thixotropic. |
| 4. 2.4 percent "Carbowax 4000" | 4,800 | not thixotropic. |
| 5. 3.0 percent "Carbowax 4000" | 5,560 | not thixotropic. |
| 6. 4.0 percent "Carbowax 4000" | 6,680 | not thixotropic. |
| 7. 4.8 percent Carbowax "4000" | 7,600 | thixotropic. |
| 8. 1.9 percent "Carbowax 6000" | 7,400 | thixotropic. |
| 9. 3 percent "Carbowax 6000" | 18,000 | thixotropic. |
| 10. 0.025 percent "Carbowax 20M" | 2,980 | not thixotropic. |
| 11. 0.5 percent "Carbowax 20M" | 11,000 | not thixotropic. |
| 12. 0.99 percent "Carbowax 20M" | 19,800 | thixotropic. |
| 13. 1.5 percent "Carbowax 20M" | 47,000 | thixotropic. |
| 14. 2.0 percent "Carbowax 20M" | 67,000 | thixotropic. |

The data of the preceding table shows the increase in viscosity obtained in unsaturated polyester resin-vinyl monomer compositions by the addition thereto of a polyalkylene glycol. The data also illustrates that a minimum concentration of a given polyalkylene glycol is required in order to obtain thixotropy in a particular polyester resin system. With a dipropylene fumarate adipate resin system a minimum of 4.8 percent "Carbowax 4000"; a minimum of 1.9 percent "Carbowax 6000"; and a minimum of 0.99 percent "Carbowax 20M" is required to impart thixotropy.

*Example V*

A series of unsaturated polyester resin-styrene monomer mixtures were modified by adding thereto 4 percent by weight of "Carbowax 20M." The starting increase in viscosity imparted to these mixtures by the addition thereto of "Carbowax 20M" is shown in the table below wherein the unsaturated polyester resin-vinyl monomer mixtures, components and method of preparation are described in Example I of the specification with the exception that in preparing the unsaturated polyester resin-vinyl mixtures the following were used.

I. Propylene maleate-phthalate polyester resin prepared by reacting 1.08 moles of propylene glycol, 0.60 mole of maleic anhydride and 0.40 mol of phthalic acid to an acid number of between 25 and 26; and 0.67 mole of styrene.

II. Diethylene propylene maleate-phthalate polyester resin prepared by reacting 0.65 mole of diethylene glycol, 0.43 mole of propylene glycol, 0.50 mole of maleic anhydride and 0.50 mole of phthalic acid to an acid number of between 23 and 24; and 0.63 mole of styrene.

III. Propylene tetrachlorophthalate anhydride-maleate polyester resin prepared by reacting 1.10 moles of propylene glycol, 0.495 mole of tetrahydrophthalic anhydride, and 0.505 mole of maleic anhydride to an acid number of between 18 and 19; and 0.92 mole of styrene.

IV. Propylene cyclopentadiene-maleate polyester resin prepared by reacting 1.05 moles of propylene glycol, 0.375 mole of dicyclopentadiene and 1.00 mole of maleic anhydride to an acid number of between 14 and 15; and 1.05 moles of styrene.

V. Butylene-1,3 maleate-phthalate polyester resin prepared by reacting 1.08 moles of butane-diol-1,3, 0.60 mole of maleic anhydride and 0.40 mole of phthalic acid to an acid number of between 20 and 21; and 0.67 mole of styrene.

VI. Diethylene-propylene maleate-isophthalate polyester resin prepared by reacting 0.65 mole of diethylene glycol, 0.43 mole of propylene glycol, 0.50 mole of maleic anhydride and 0.50 mole of isophthalic acid to an acid number of between 17 and 18; and 0.63 mole of styrene.

VII. Propylene tetrahydrophthalate-maleate polyester resin prepared by reacting 1.07 moles of propylene glycol, 0.50 mole of tetrahydrophthalate and 0.50 mole of maleic anhydride to an acid number of between 20 and 21; and 0.87 mole of styrene.

| Compositions containing 4 percent "Carbowax 20M" | Brookfield "Peak" Viscosities at 25° C. | |
|---|---|---|
| | Original Viscosity of Composition containing no "Carbowax", centipoise | Viscosity of composition after the addition thereto of "Carbowax 20M", centipoise |
| 1. Propylene maleate-phthalate polyester resin-styrene mixture | 2,400 | 17,000 |
| 2. Diethylene propylene maleate-phthalate polyester resin-styrene mixture | 2,786 | 15,000 |
| 3. Propylene tetrachlorophthalate-maleate polyester resin-styrene mixture | 4,006 | 23,000 |
| 4. Propylene cyclopentadiene-maleate polyester resin-styrene mixture | 743 | 5,000 |
| 5. Butylene-1,3 maleate phthalate polyester resin-styrene mixture | 2,174 | 8,000 |
| 6. Diethylene-propylene maleate-isophthalate polyester resin-styrene mixture | 1,535 | 7,000 |
| 7. Propylene tetrahydrophthalate-maleate polyester resin-styrene mixture | 1,123 | 4,000 |

What is claimed is:

1. A thermosetting composition comprising an unsaturated polyester resin which is the reaction product of a polyhydric alcohol and a compound selected from the group consisting of olefinic unsaturated polycarboxylic acids and anhydrides of olefinic unsaturated polycarboxylic acids, a vinyl monomer having the formula $CH_2=CHR$, wherein R is a group having unsaturation in conjugation with the $CH_2=CH-$ group and selected from the group consisting of aryl, ketonic, heterocyclic, nitrile, carbalkoxy, carboxy, and amido, said vinyl monomer being present in an amount of from about 20 to about 75 percent by weight based on the weight of said polyester resin, and a polyalkylene glycol selected from the group consisting of polyethylene glycols and polypropylene glycols, said polyalkylene glycol having a molecular weight of from about 3000 to about 20,000 and being present in an amount of from about 0.025 to 20 percent by weight based on the weight of the said polyester resin and said vinyl monomer.

2. A composition as defined in claim 1 wherein the polyalkylene glycol is polyethylene glycol.

3. A composition as defined in claim 1 wherein the polyalkylene glycol is polypropylene glycol.

4. A composition as defined in claim 1 wherein the polyalkylene glycol is methoxy polyethylene glycol.

5. A composition as defined in claim 1 wherein the unsaturated polyester resin is a dipropylene fumarate-adipate resin.

6. A composition as defined in claim 1 wherein the polyalkylene glycol is methoxy polypropylene glycol.

7. A composition as defined in claim 1 wherein the vinyl monomer is styrene.

8. A thixotropic composition comprising a dipropylene fumarate-adipate polyester resin, styrene in an amount of from about 20 to about 75 percent by weight based on the weight of said polyester resin, and about 0.99 percent by weight of a polyalkylene glycol selected from the group consisting of polyethylene glycols and polypropylene glycols, said polyalkylene glycol having an average molecular weight of between about 15,000 and 20,000.

9. A thixotropic composition comprising a dipropylene fumarate-adipate polyester resin, styrene in an amount of from about 20 to about 75 percent by weight based on the weight of said polyester resin, and about 4.8 percent by weight of a polyalkylene glycol selected from the group consisting of polyethylene glycols and polypropylene glycols, said polyalkylene glycol having an average molecular weight of between about 3,000 and 3,700.

10. A thixotropic composition comprising a dipropylene fumarate-adipate polyester resin, styrene in an amount of from about 20 to about 75 percent by weight based on the weight of said polyester resin and about 1.9 percent by weight of a polyalkylene glycol selected from the group consisting of polyethylene glycols and polypropylene glycols, said polyalkylene glycol having an average molecular weight of between about 6,000 and 7,000.

11. A composition as defined in claim 1 wherein the unsaturated polyester resin is a diethylene propylene maleate phthalate resin.

12. A composition as defined in claim 1 wherein the unsaturated polyester resin is a propylene tetrachlorophthalate maleate resin.

13. A composition as defined in claim 1 wherein the unsaturated polyester resin is a propylene cyclopentadiene maleate resin.

14. A composition as defined in claim 1 wherein the unsaturated polyester resin is a diethylene propylene maleate isophthalate resin.

15. Process for producing a thermosetting composition which comprises admixing at a temperature of between about 55° C. and 125° C. an unsaturated polyester resin which is the reaction product of a polyhydric alcohol and a compound selected from the group consisting of olefinic unsaturated polycarboxylic acids and anhydrides of olefinic unsaturated polycarboxylic acids, a vinyl monomer having the formula $CH_2=CHR$, wherein R is a group having unsaturation in conjugation with the $CH_2=CH-$ group, and selected from the group consisting of aryl, ketonic, heterocyclic, nitrile, carbalkoxy, carboxy, and amido, said vinyl monomer being present in an amount of from about 20 to about 75 percent by weight, based on the weight of said polyester resin, and a polyalkylene glycol selected from the group consisting of polyethylene glycols and polypropylene glycols, said polyalkylene glycol having a molecular weight of from about 3000 to about 20,000 and being present in an amount of from about 0.025 to about 20 percent by weight based on the weight of the said polyester resin and said vinyl monomer.

References Cited in the file of this patent

UNITED STATES PATENTS

| | | |
|---|---|---|
| 2,393,816 | Savage | Jan. 29, 1946 |
| 2,568,331 | Frilette | Sept. 18, 1951 |
| 2,811,493 | Simon et al. | Oct. 29, 1957 |